United States Patent
Cooperman et al.

(10) Patent No.: US 6,768,777 B1
(45) Date of Patent: Jul. 27, 2004

(54) METHOD AND APPARATUS FOR CALCULATING THE NUMBER OF VERY HIGH SPEED DIGITAL SUBSCRIBER LINE NODES

(75) Inventors: Michael Cooperman, Framingham, MA (US); Albert M. Forcucci, Roslindale, MA (US); John W. Lovell, Sherborn, MA (US); Craig A. Armiento, Acton, MA (US)

(73) Assignees: Verizon Corporate Services Group Inc., New York, NY (US); Genuity Inc., Cambridge, MA (US)

( * ) Notice: Subject to any disclaimer, the term of this patent is extended or adjusted under 35 U.S.C. 154(b) by 785 days.

(21) Appl. No.: 09/604,230

(22) Filed: Jun. 27, 2000

(51) Int. Cl.[7] .............................................. H04B 3/00
(52) U.S. Cl. ...................... 375/257; 375/222; 375/377; 379/399.01
(58) Field of Search .............................. 375/257, 222, 375/377; 379/399.01

(56) References Cited

U.S. PATENT DOCUMENTS

| | | | |
|---|---|---|---|
| 5,756,280 A | 5/1998 | Soora et al. | 455/4.2 |
| 5,878,047 A * | 3/1999 | Ganek et al. | 370/486 |
| 5,991,140 A | 11/1999 | Hughes et al. | 361/119 |
| 5,999,565 A | 12/1999 | Locklear, Jr. et al. | 375/222 |

* cited by examiner

Primary Examiner—Young T. Tse
Assistant Examiner—David B. Lugo
(74) Attorney, Agent, or Firm—Leonard C. Suchyta, Esq.; Joel Wall; Fitzpatrick, Cella, Harper & Scinto

(57) ABSTRACT

A method is provided for estimating a number of digital subscriber line nodes (220, 230) required to supply, from a line supply source (200), a geographically distributed network of substantially sequentially numbered twisted pair lines with digital subscriber line service. The method comprises the steps of: storing, in number order, data entries for every twisted pair line of the network, each data entry comprising a pair number and a line length of the respective twisted pair line in relation to the line supply source (200); sorting the entries stored in the database by line length; isolating those sorted entries whose twisted pair lines have a line length greater than a predetermined maximum line length in relation to the line supply source (200); sorting the isolated entries by number; and discriminating, from the sorted isolated entries, the presence of discrete groupings of substantially contiguous entries.

20 Claims, 9 Drawing Sheets

| Pair NO | Length |
|---|---|
| 1 | 100 |
| 2 | 200 |
| 3 | 300 |
| 4 | 400 |
| 27 | 600 |
| 34 | 600 |
| 5 | 700 |
| 28 | 700 |
| 35 | 700 |
| 6 | 800 |
| 29 | 800 |
| 36 | 800 |
| 7 | 900 |
| 30 | 900 |
| 37 | 900 |
| 8 | 1,000 |
| 31 | 1,000 |
| 38 | 1,000 |
| 32 | 1,100 |
| 39 | 1,100 |
| 9 | 1,200 |
| 33 | 1,200 |
| 10 | 1,300 |
| 40 | 1,300 |
| 51 | 1,300 |
| 56 | 1,300 |
| 11 | 1,400 |
| 41 | 1,400 |
| 52 | 1,400 |
| 57 | 1,400 |
| 12 | 1,500 |
| 42 | 1,500 |
| 53 | 1,500 |
| 58 | 1,500 |
| 13 | 1,600 |

| Pair NO | Length |
|---|---|
| 43 | 1,600 |
| 54 | 1,600 |
| 59 | 1,600 |
| 14 | 1,700 |
| 44 | 1,700 |
| 55 | 1,700 |
| 60 | 1,700 |
| 45 | 1,800 |
| 61 | 1,800 |
| 15 | 1,900 |
| 46 | 1,900 |
| 16 | 2,000 |
| 67 | 2,000 |
| 17 | 2,100 |
| 62 | 2,100 |
| 68 | 2,100 |
| 18 | 2,200 |
| 63 | 2,200 |
| 69 | 2,200 |
| 64 | 2,300 |
| 70 | 2,300 |
| 19 | 2,400 |
| 65 | 2,400 |
| 20 | 2,600 |
| 47 | 2,600 |
| 66 | 2,600 |
| 21 | 2,700 |
| 48 | 2,700 |
| 22 | 2,800 |
| 23 | 2,900 |
| 24 | 3,000 |
| 49 | 3,000 |
| 25 | 3,100 |
| 50 | 3,200 |
| 26 | 3,300 |

FIG. 5C

| Pair NO | Length |
|---------|--------|
| 20 | 2,600 |
| 47 | 2,600 |
| 66 | 2,600 |
| 21 | 2,700 |
| 48 | 2,700 |
| 22 | 2,800 |
| 23 | 2,900 |
| 24 | 3,000 |
| 49 | 3,000 |
| 25 | 3,100 |
| 50 | 3,200 |
| 26 | 3,300 |

FIG. 5D

| Pair NO | Length |
|---------|--------|
| 20 | 2,600 |
| 21 | 2,700 |
| 22 | 2,800 |
| 23 | 2,900 |
| 24 | 3,000 |
| 25 | 3,100 |
| 26 | 3,300 |
| 47 | 2,600 |
| 48 | 2,700 |
| 49 | 3,000 |
| 50 | 3,200 |
| 66 | 2,600 |

METHOD AND APPARATUS FOR CALCULATING THE NUMBER OF VERY HIGH SPEED DIGITAL SUBSCRIBER LINE NODES

BACKGROUND OF THE INVENTION

1. Field of the Invention

The present invention relates to a method and apparatus for determining the number of distribution nodes necessary to provide Very High Speed Digital Subscriber Line (VDSL) services to subscribers.

2. Related Art

Conventional modulator-demodulators ("modems"), have traditionally been used in home and small business personal computers (PC's) to connect to the Internet over telephone lines. Such modems modulate the digital signals from a computer into analog signals, more specifically modulated tones in the voice-band (DC to 4 KHz) that can be sent over telephone lines through the Public Switched Telephone Network (PSTN), and demodulate incoming analog signals back into digital signals that the computer can process them. However, due to the bandwidth limitations imposed by bandpass filters and codes at PSTN interface points, traditional modems have, for all practical purposes, reached their speed limit with the introduction of the 56 Kbps models.

The above-mentioned speed limitations of traditional voice-band modems make such modems less than satisfactory for meeting the demand for downloading graphic intensive Internet web pages and other information, and even worse for the type of two-way information transfer required for video conferencing. In recent years, several options have been introduced for providing broadband access at speeds significantly higher than voice-band modems. Among the high speed options available are T1 and cable lines. However, each of these technologies requires that specialized wiring be installed at the subscribers location, at a cost that may be prohibitive to home and small business users.

Among the newest high-speed alternatives is Digital Subscriber Line (DSL) technology. DSL uses a subscriber's existing copper POTS ("plain old telephone system") lines to gain access to the Internet and other high-speed data and video services—up to 55 Mbps. Thus, DSL offers the advantage of making use of lines already connected to the subscriber, but with speeds exceeding T1 and cable lines.

The use of DSL requires the presence of a DSL modem at the subscriber and a counterpart at the service provider, usually the local telephone company, connected by a twisted pair copper telephone line. DSL modems send and receive data, over POTS lines, in a frequency range that is higher than the voice-band, and which permits much higher data rates. And because voice-band modem transmissions and voice calls use only a portion of the available bandwidth of the POTS line, a subscriber can carry on a telephone conversation, or use a voice-band modem, while at the same time operating a DSL modem.

One factor that must be taken into account in applying DSL technology is that the twisted pair subscriber lines have distortion and losses that increase with frequency and line length. Thus, for DSL to work properly, there is a limit to the line length between a subscriber's DSL modem and the phone company's answering DSL modem, the permissible line length decreasing the higher the data rate offered over the line. To account for this limitation, DSL providers must limit the length of the copper line over which the DSL signal is transmitted.

FIG. 1 shows a conventional method for sending a basic telephone signal from the telephone company's central office to the subscriber via twisted pair copper telephone lines. As shown in the figure, some subscribers, such as those having telephones 106, have twisted pair lines 104 connected directly to the central office (CO) 100. Other subscribers have their telephones 110 connected to the CO 100 through a cross connect 102. The use of the cross connect 102 makes it practical to connect a larger number of subscribers to the CO 100, and most CO's are large enough so that over 80% of the twisted pairs are connected through cross connects.

The telephone network was originally designed to provide voice-band telephone service up to 4 KHz. In order to provide VDSL services, operating typically at a much higher frequency than voice-band signals, the subscriber copper line may have to be less than 2500 feet, which is the typical range of present VDSL modems. Since subscribers may be located over 12,000 feet from the central office or cross connect, the telephone company's VDSL modem is placed within 2500 feet of the subscriber and connected to the CO by means of an optical fiber. Although the figure of 2500 feet will be used throughout the specification as the critical length, that length may vary depending upon the data rate, wire gauge, and other factors.

FIG. 2 shows the basic method for connecting DSL lines to subscribers. Elements in common with FIG. 1 will be assigned the same reference numerals as in that figure.

As shown in FIG. 2, VDSL NODE 1 112, comprising a VDSL modem present at the CO 100, is connected directly via twisted pairs 104, to subscribers using telephones 106, each of which is less than 2500 feet from the CO 100. On the other hand, twisted pairs 108, associated with telephones 110, each are connected to the CO 100 via cross connect 102 and are at a distance greater than 2500 feet from the CO 100. To supply VDSL service to these subscribers, an optical line 114 is run to a VDSL NODE 2 116 located within 2500 feet of each of the subscribers. The information to be supplied to the subscribers is sent as an optical signal via the optical line 114 to the VDSL NODE 2, converted into an electrical signal and supplied to the twisted pair lines 108 for distribution to the subscribers.

FIG. 3 shows a typical distribution of twisted pairs from a cross connect 200 to the subscriber. In the figure, pairs 1–26 supply service to Main Street. Pairs 27–50 supply service to Grove Street. Pairs 51–61 supply service to Joy Street, and pairs 62–70 supply service to Alice Street. In a layout such as is shown in FIG. 3, the trunk telephone cable would typically run along Main Street, with branch cables being separated from the trunk cable for side streets such as Grove Street, Joy Street and Alice Street.

As can be seen from the distance indications on FIG. 3, the layout includes pairs that are more than 2500 feet in line length from the cross connect 200. Thus, assuming the cross connect itself has a node supplied directly from the CO, additional VDSL nodes would be needed to supply pairs more than 2500 feet from the cross connect.

In the layout of FIG. 3, it can be discerned by visual inspection that a node, supplied by optical cable, would have to be installed at the cross connect 200 to supply pairs located at a line length less than 2500 feet from the cross connect 200. A node placed at a cross connect will be referred to hereinafter as a "first level" node. However, since a number of the pairs shown in the figure are located more than 2500 feet in line length from the cross connect, additional node or nodes, to be referred to hereinafter as "second level" nodes, will be necessary to supply those pairs.

For example, it appears from a cursory examination of FIG. 3 that a second level node would have to be placed on Main Street at a line length 2500 feet from the cross connect to supply pairs on Main Street located at a line length more than 2500 feet from the cross connect 200, another second level node placed on Grove Street at a line length 2500 feet from the cross connect to supply pairs on that street that are located at a line length more than 2500 feet from the cross connect, and yet another second level node placed on Alice Street to supply pair 66, which is located at a line length more than 2500 feet from the cross connect.

FIG. 3 shows a layout of only a small number of streets. In actual street layouts, which for a particular CO may have over 100 cross connects, each having over 1000 pairs, calculation of the number of branches containing pairs having a line length longer than 2500 feet (hereinafter "branches of interest") can take many weeks. Further, even if it is determined how many such branches are present, it may not be strictly necessary to provide a dedicated second level node to each branch. That is, it may be possible to further reduce the number of nodes by having some of the branches of interest share a second level node. This complicating factor makes it even more difficult to quickly provide an accurate estimate of the number of nodes that may be needed to service a given area, even after the number of branches of interest have been determined.

Thus, there exists a need for a method and apparatus for quickly and accurately calculating the number of branches of interest and of estimating the minimum number of VDSL nodes necessary for any given street layout.

SUMMARY OF THE INVENTION

It is an object of the present invention to provide a method of estimating, for a given twisted pair layout, the number of VDSL nodes necessary to supply service to subscribers connected via the twisted pairs, and to do so much more quickly than prior art methods.

In accordance with one aspect of the present invention, there is provided a method for estimating a number of digital subscriber line nodes required to supply, from a line supply source, a geographically distributed network of substantially sequentially numbered twisted pair lines with digital subscriber line service. The method comprises the steps of: storing, in number order, data entries for every twisted pair line of the network, each data entry comprising a pair number and a line length of the respective twisted pair line in relation to the line supply source; sorting the entries stored in the database by line length; isolating those sorted entries having a line length greater than a predetermined maximum line length in relation to the line supply source; sorting the isolated entries by number; and discriminating, from the sorted isolated entries, a number of discrete groupings of substantially contiguous entries. The number of required line nodes is equal to one plus the number of discrete groups, other than a first such group, that are separated in line number from an immediately previous group by more than a predetermined number. Preferably, the predetermined number is calculated based upon an area density of subscribers in the geographically distributed network.

In accordance with another aspect of the present invention, there is provided an apparatus structured to estimate a number of digital subscriber line nodes required to supply, from a line supply source, a geographically distributed network of substantially sequentially numbered twisted pair lines with digital subscriber line service. The apparatus comprises: means for storing, in number order, data entries for every twisted pair line of the network, each data entry comprising a pair number and a line length of the respective twisted pair line in relation to the line supply source; means for sorting the entries stored in the database by line length; means for isolating those sorted entries having a line length greater than a predetermined maximum line length in relation to the line supply source; means for sorting the isolated entries by number; and means for discriminating, from the sorted isolated entries, a number of discrete groupings of substantially contiguous entries. The number of required line nodes is equal to one plus the number of discrete groups, other than a first such group, that are separated in line number from an immediately previous group by more than a predetermined number. Preferably, the predetermined number is calculated based upon an area density of subscribers in the geographically distributed network.

In accordance with yet another aspect of the present invention, there is provided a computer-readable storage medium storing code executable on a processor-controlled apparatus to cause the apparatus to perform a method for estimating a number of digital subscriber line nodes required to supply, from a line supply source, a geographically distributed network of substantially sequentially numbered twisted pair lines with digital subscriber line service. The method comprises: storing, in number order, data entries for every twisted pair line of the network, each data entry comprising a pair number and a line length of the respective twisted pair line in relation to the line supply source; sorting the entries stored in the database by line length; isolating those sorted entries having a line length greater than a predetermined maximum line length in relation to the line supply source; sorting the isolated entries by number; and discriminating, from the sorted isolated entries, a number of discrete groupings of substantially contiguous entries. The number of required line nodes is equal to one plus the number of discrete groups, other than a first such group, that are separated in line number from an immediately previous group by more than a predetermined number.

Preferably, the predetermined number is calculated based upon an area density of subscribers in the geographically distributed network.

In accordance with still another aspect of the present invention, there is provided a system for calculating a number of digital subscriber line nodes required to supply, from a line supply source, a geographically distributed network of substantially sequentially numbered twisted pair lines with digital subscriber line service, the system comprising: a digital storage circuit that stores, in number order, data entries for every twisted pair line of the network, each data entry comprising a pair number and a line length of the respective twisted pair line in relation to the line supply source; and a digital logic circuit operable to interface with the digital storage circuit to: sort the entries stored in the digital storage circuit by line length; isolate those sorted entries having a line length greater than a predetermined maximum line length in relation to the line supply source; sort the isolated entries by number; and discriminate, from the sorted isolated entries, a number of discrete groupings of substantially contiguous entries. The number of required line nodes is equal to one plus the number of discrete groups, other than a first such group, that are separated in line number from an immediately previous group by more than a predetermined number. Preferably, the predetermined number is calculated based upon an area density of subscribers in the geographically distributed network.

In accordance with another aspect of the present invention, there is provided a method for calculating a number and location of digital subscriber line nodes guaranteed to supply, from a line supply source, a geographically distributed network of substantially sequentially numbered twisted pair lines with digital subscriber line service. The method comprises the steps of: storing, in number order, data entries for every twisted pair line of the network, each data entry comprising a pair number and a line length of the respective twisted pair line in relation to the line supply source; sorting the entries stored in the database by line length; isolating those sorted entries having a line length greater than a predetermined maximum line length in relation to the line supply source; sorting the isolated entries by number; and discriminating, from the sorted isolated entries, a number of discrete groupings of substantially contiguous entries. The number of nodes is equal to the discriminated number of discrete groups and the nodes are located at the twisted pair from among each discrete group having the shortest line length.

In accordance with another aspect of the present invention, there is provided apparatus structured to calculate a number and location of digital subscriber line nodes guaranteed to supply, from a line supply source, a geographically distributed network of substantially sequentially numbered twisted pair lines with digital subscriber line service. The apparatus comprises: means for storing, in number order, data entries for every twisted pair line of the network, each data entry comprising a pair number and a line length of the respective twisted pair line in relation to the line supply source; means for sorting the entries stored in the database by line length; means for isolating those sorted entries having a line length greater than a predetermined maximum line length in relation to the line supply source; means for sorting the isolated entries by number; and means for discriminating, from the sorted isolated entries, a number of discrete groupings of substantially contiguous entries. The number of nodes is equal to the discriminated number of discrete groups and the nodes are located at the twisted pair from among each discrete group having the shortest line length.

In accordance with yet another aspect of the present invention, there is provided a computer-readable storage medium storing code executable on a processor-controlled apparatus to cause the apparatus to perform a method for calculating a number and location of digital subscriber line nodes guaranteed to supply, from a line supply source, a geographically distributed network of substantially sequentially numbered twisted pair lines with digital subscriber line service. The method comprises: storing, in number order, data entries for every twisted pair line of the network, each data entry comprising a pair number and a line length of the respective twisted pair line in relation to the line supply source; sorting the entries stored in the database by line length; isolating those sorted entries having a line length greater than a predetermined maximum line length in relation to the line supply source; sorting the isolated entries by number; and discriminating, from the sorted isolated entries, a number of discrete groupings of substantially contiguous entries. The number of nodes is equal to the discriminated number of discrete groups and the nodes are located at the twisted pair from among each discrete group having the shortest line length.

In accordance with still another aspect of the present invention, there is provided a system for calculating a number and location of digital subscriber line nodes guaranteed to supply, from a line supply source, a geographically distributed network of substantially sequentially numbered twisted pair lines with digital subscriber line service. The system comprises: a digital storage circuit that stores, in number order, data entries for every twisted pair line of the network, each data entry comprising a pair number and a line length of the respective twisted pair line in relation to the line supply source; and a digital logic circuit operable to interface with the digital storage circuit to: sort the entries stored in the digital storage circuit by line length; isolate those sorted entries having a line length greater than a predetermined maximum line length in relation to the line supply source; sort the isolated entries by number; and discriminate, from the sorted isolated entries, a number of discrete groupings of substantially contiguous entries. The number of nodes is equal to the discriminated number of discrete groups and the nodes are located at the twisted pair from among each discrete group having the shortest line length.

BRIEF DESCRIPTION OF THE DRAWINGS

The present invention will be more readily understood from a detailed description of the preferred embodiments taken in conjunction with the following figures.

FIG. 5C is a listing of those entries from FIG. 5B that have a distance greater than 2500 feet;

FIG. 5D is a listing showing the result of sorting the database of FIG. 5C by pair number;

DETAILED DESCRIPTION OF THE PREFERRED EMBODIMENTS

In accordance with the present invention, by using a computer implemented method, the determination of the number and placement of VDSL nodes can be made automatically in a matter of minutes even for extremely complex street layouts having thousands of twisted pairs.

Telephone companies generally assign the numbering of twisted pairs in a given street layout in a sequential manner. Generally, the initial sequence is assigned first along a particular main line along which the trunk cable is installed, assigning numbers for twisted pairs along that line until it reaches its termination point, and continuing the sequential assignment of numbers on streets branching off from the main line beginning with the next available number. Such branch streets are supplied with service by cutting into the trunk cable and separating a sub-cable, and assigning the twisted pairs from the sub-cable to subscribers on that branch. For example, in the layout shown in FIG. 3, Main Street's numbering is sequential out to the end of the street and the sequential numbering resumes on the upper branch of Grove Street until its termination, followed in turn by the lower branch.

As a result of this method of assigning numbers to the twisted pairs, the numbering of a twisted pair does not directly correlate with its line distance from the cross connect. For example, on Main Street, it is pairs 20–26 that are located at a line distance greater than 2500 feet. However, on Grove Street, pairs 47–50 are located at a distance greater than 2500 feet. In view of the lack of a simple correlation between distance and line numbering, a simple examination of line numbers will not, in and of itself, reveal which twisted pairs, if any, have a line length of more than 2500 feet.

However, because of the practice of sequential numbering, the presence of a gap between pairs 26 and 47 signifies the existence of a separate street, or branch. The method of the present invention discriminates the presence of such gaps in pair numbering, indicative of the presence of branch streets, to assist in determining the number of branches of interest, which may require additional VDSL nodes,. i.e., nodes in addition to the one supplied to the cross connect itself. Moreover, the method of the present invention allows a planner to accurately estimate the minimum number of nodes that would be necessary to supply a given area. Such information can assist in determining whether it is economically feasible to introduce VDSL service to the area.

Figure 4:
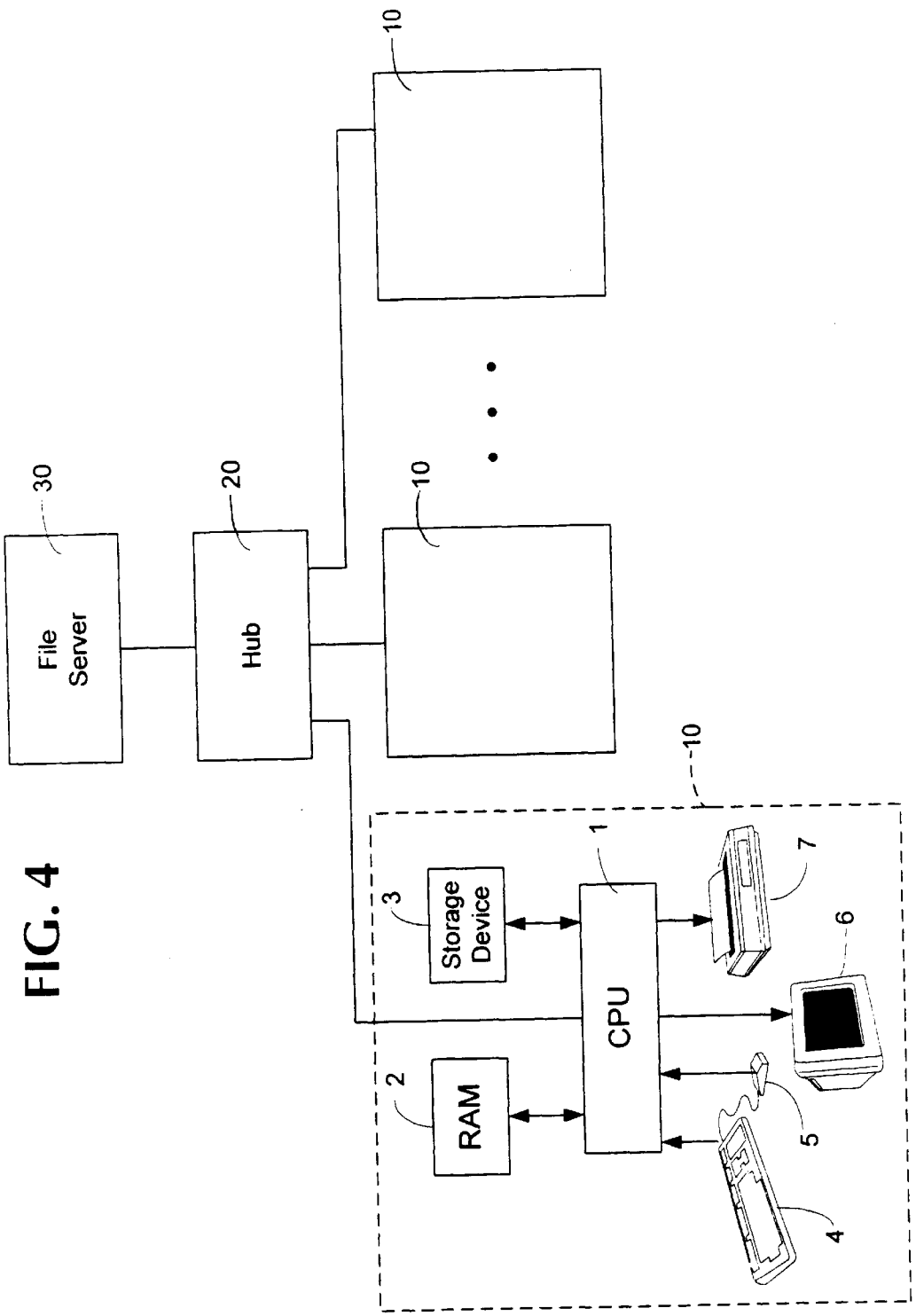
FIG. 4 is a hardware configuration with which the present invention may be implemented in accordance with a preferred embodiment.

In accordance with a preferred embodiment of the present invention, in consideration of the foregoing, a programmable computer apparatus, such as is shown in FIG. 4, is programmed to discriminate, using the method of the present invention, the number of branches of interest and to accurately estimate the minimum number of VDSL nodes necessary for any given layout of twisted pairs the numbers and line lengths of which are stored in a database.

A basic hardware configuration with which the present invention may be implemented is depicted schematically in FIG. 4. This configuration in accordance with a preferred embodiment is a local area network ("LAN") which includes a plurality of individual workstations 10, a hub 20 and a file server 30. Each workstation includes a CPU 1, a random access memory ("RAM") 2 and a data storage device 3. The data storage device 3 may comprise, for example, a floppy disk and a drive, a hard disk and drive, a CD-ROM and drive, or the like, or any combination thereof.

Each work station further includes one or more input devices such as a keyboard 4 and/or a mouse 5, and one or more output devices, such as a monitor 6 and/or a printer 7. Each workstation 10 is structured so as to be able to communicate with a central file server 30 through the hub 20, in a manner that will be readily apparent to those skilled in the computer arts.

In operation, a software program implementing the present invention may be stored in the storage device 3 of each workstation 10, so that the CPU 1 of each workstation 10 may execute the program when so directed by an operator. Alternatively, the software program, or a portion thereof, may be stored in the file server 30. Preferably, all data records that the software program creates (to be discussed in grater detail below) are stored in the file server 30, so that those data records may be accessed by any of the workstations 10. The file server 30 also may store other information that may need to be accessed by all of the workstations 10.

The hardware configuration depicted in FIG. 4, of course, is exemplary only, and any number other hardware configurations could be used to implement the present invention. For example, different LAN topologies might be used. If it is desirable to locate the various workstations 10 in more than one building or complex, a metropolitan area network ("MAN") configuration might be used; if it is desirable to locate the various workstations 10 in more than one city a wide area network ("WAN") configuration might be used. On the other hand, if it is desirable to implement the invention using only a single computer, no network may be necessary at all, and the data records may simply be stored in the storage device 3 of a single workstation 10. Further still, irrespective of the particular configuration used, additional hardware and software, such as a modem connected to a telephone line or to a dedicated data line, might be incorporated to allow stored information to be accessed remotely.

The technique of the preferred embodiment of the present invention will next be described with reference to the flowchart of FIG. 6 and the database listings of FIGS. 5A–5D, which for simplicity of explanation, contain data corresponding to the simplified street layout of FIG. 3. However, the technique of the present invention is particularly advantageous when used in conjunction with extremely large street layouts, of a type difficult to estimate by prior art methods.

Figure 5A:
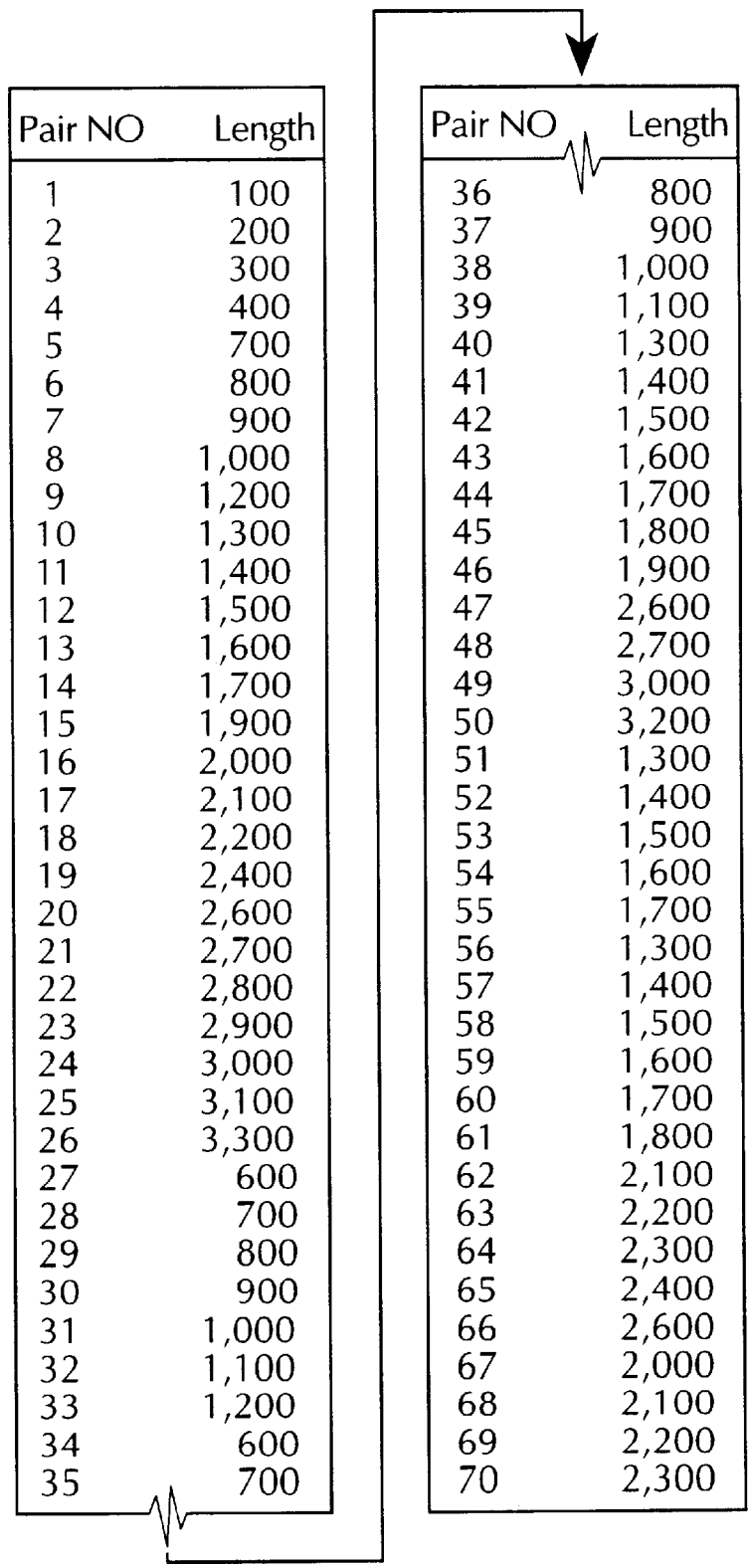
FIG. 5A is a listing of entries from a database containing number and distance information for the twisted pairs shown in FIG. 3.

In accordance with the present invention, to determine the number of branches of interest and to estimate accurately the minimum number of VDSL nodes necessary for any given street layout, an ordered database of number and distance information for each twisted pair first is generated, at step S1, and stored in data storage device 3, or on storage space in the file server computer 30. An example listing of entries present in such a database is shown in FIG. 5A. As shown in that figure, each database entry contains, for each twisted pair, at least the numerical designation and line distance for that twisted pair. The twisted pair entries shown in FIG. 5A correspond to those from the simplified street layout of FIG. 3. The database for an actual street layout typically would contain thousands of entries. As can be seen from the listing in FIG. 5A, the twisted pair entries are arranged in the database in numerical order.

Figure 5B:
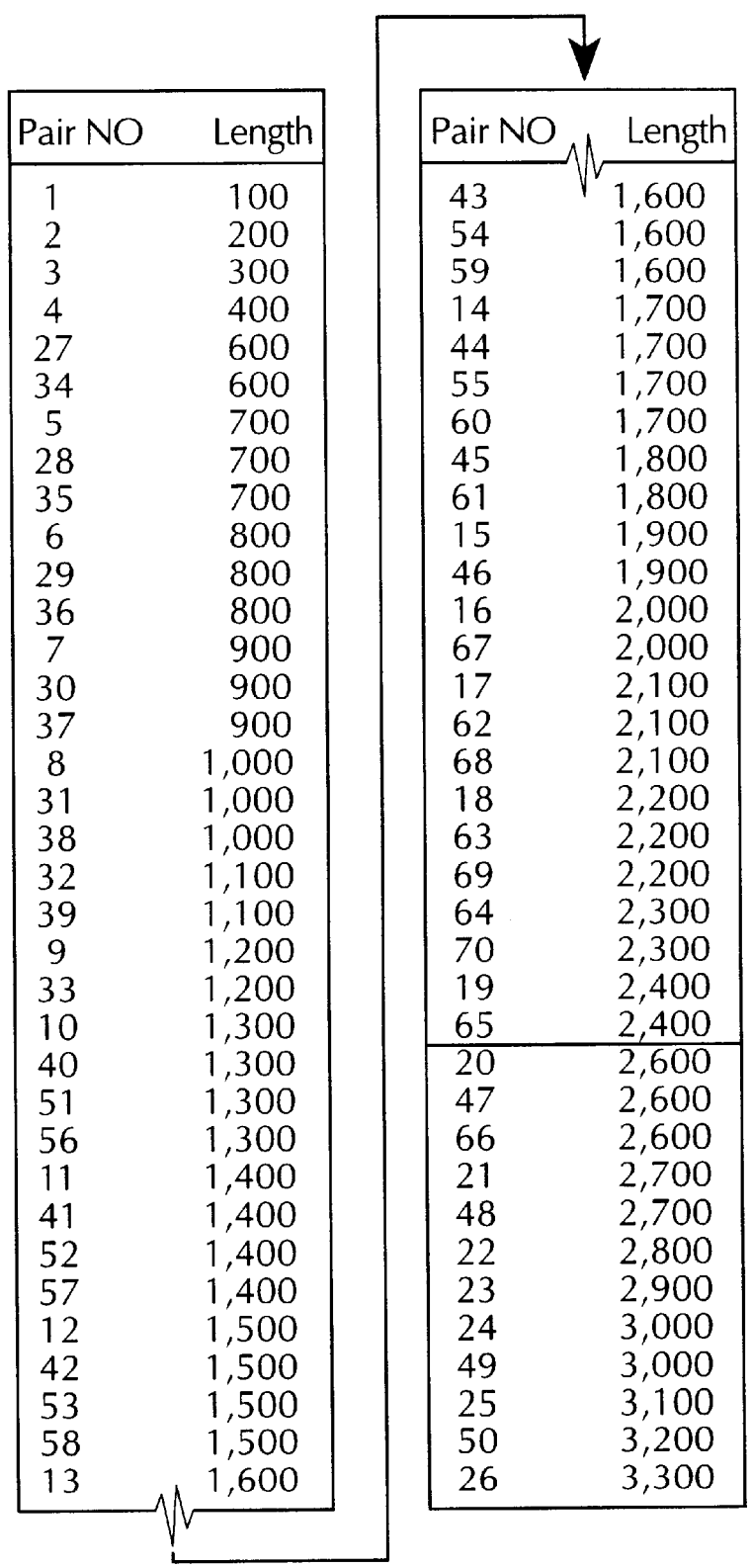
FIG. 5B is a listing showing the result of sorting the database of FIG. 5A by distance.
Figure 6:
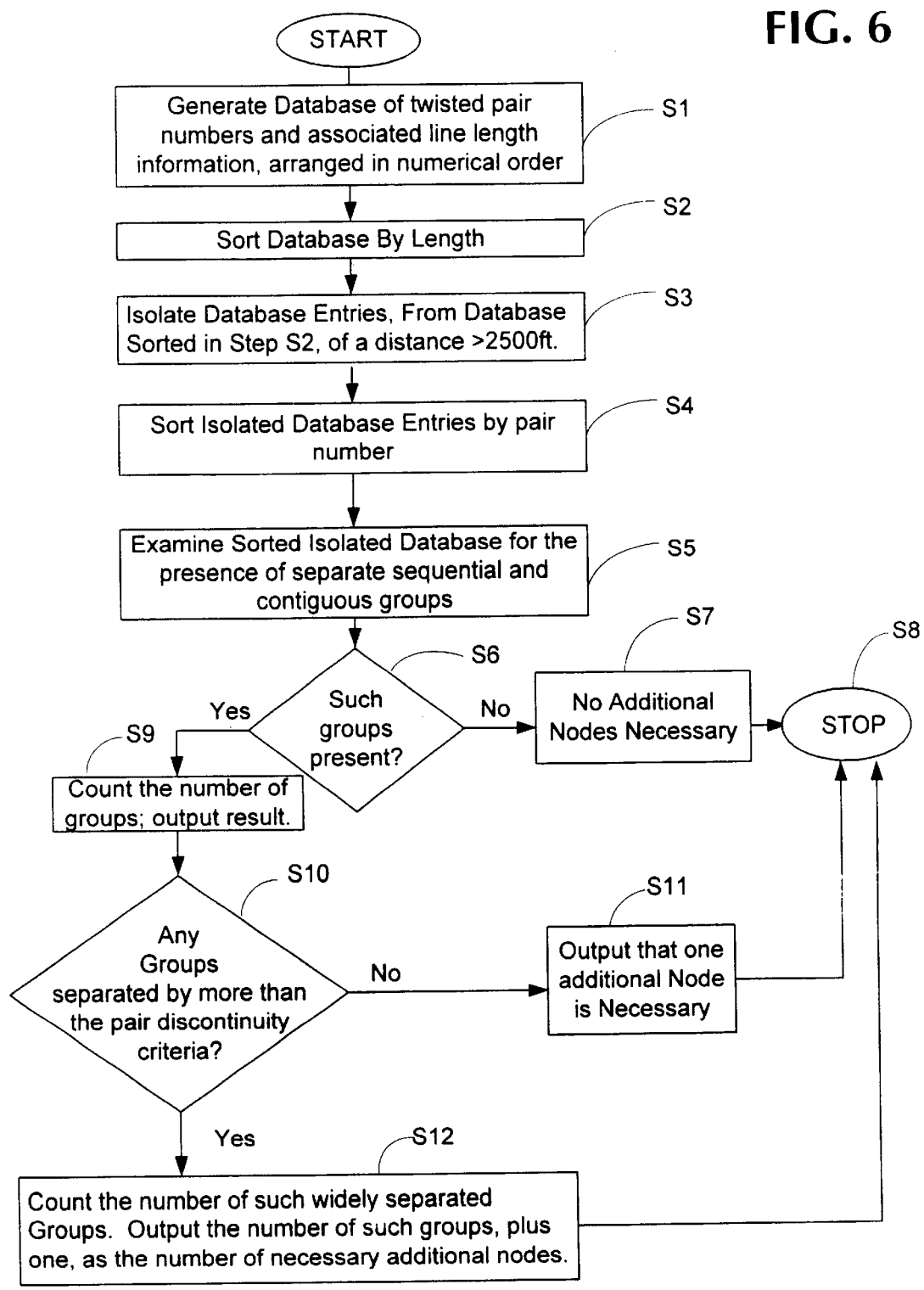
FIG. 6 is a flowchart illustrating the method of the present invention in accordance with a preferred embodiment.

As shown in FIG. 6, in step S1 a database of twisted pair numbers and associated line length information is generated, and arranged in numerical order. To calculate the number of branches of interest for this street layout, the method of the present invention processes the data stored in the database. In step S2, the first such processing step, the database of twisted pair entries is sorted on the basis of line length. FIG. 5B is a listing showing the result of such a sort.

Next, at step S3, entries from the sorted database having a distance greater than 2500 feet are isolated. Of course, for VDSL implementations using different transmission speeds, the critical line length may differ from 2500 feet, as was discussed above. In such a case, of course, that critical length would be used throughout the process instead of 2500 feet.

A listing of the isolated entries is shown in FIG. 5C. Then, in step S4, those pairs isolated in FIG. 5C having line lengths greater than 2500 feet are sorted by pair number. The result of this second sorting operation is shown in FIG. 5D.

Next, in step S5, the numerically sorted isolated database is examined for the presence of separate sequential and contiguous groups of entries. If it is discriminated at step S6 that no such groups are present, the flow proceeds to step S7 and then the program terminates at step S8. If such a group or groups are determined to be present, the flow proceed to step S9, where the number of groups is output. In the example, an examination of the listing of FIG. 5D reveals the presence of three separate sequential and contiguous groups of numbers, 20–26, 47–50 and the separate "group" consisting of pair 66, which is on its own because it is the only pair on a branch that has a line length of more than 2500 feet.

The inventors have discovered that the presence of such contiguous separate groupings of twisted pairs numbers in the sorted result indicates the presence of branches of interest, each containing twisted pairs at a line distance greater than 2500 feet, a fact that would indicate that those twisted pairs may require a VDSL node.

Figure 1:
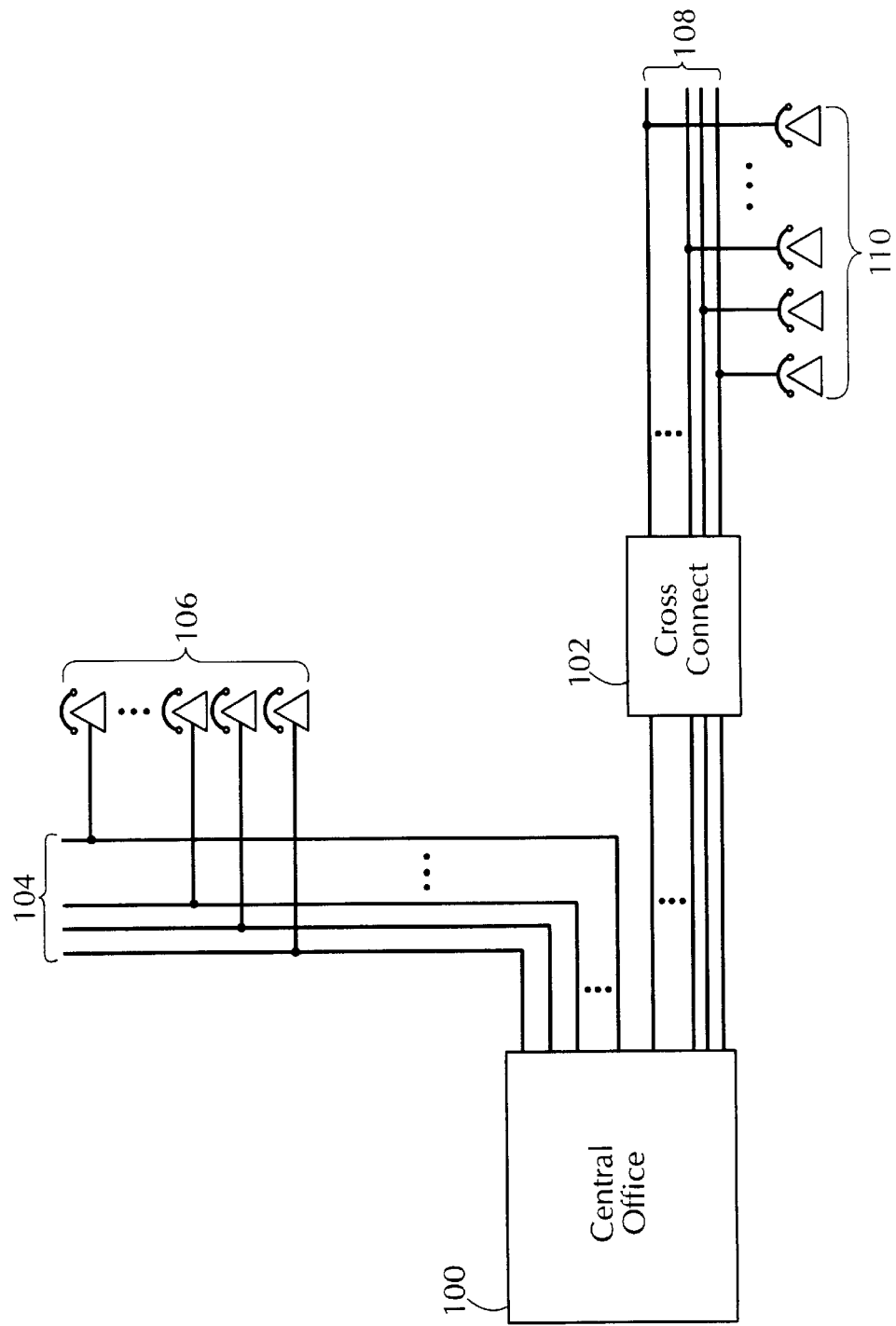
FIG. 1 is a block diagram illustrating the basic configuration used to send a telephone signal from a central office to each subscriber.
Figure 2:
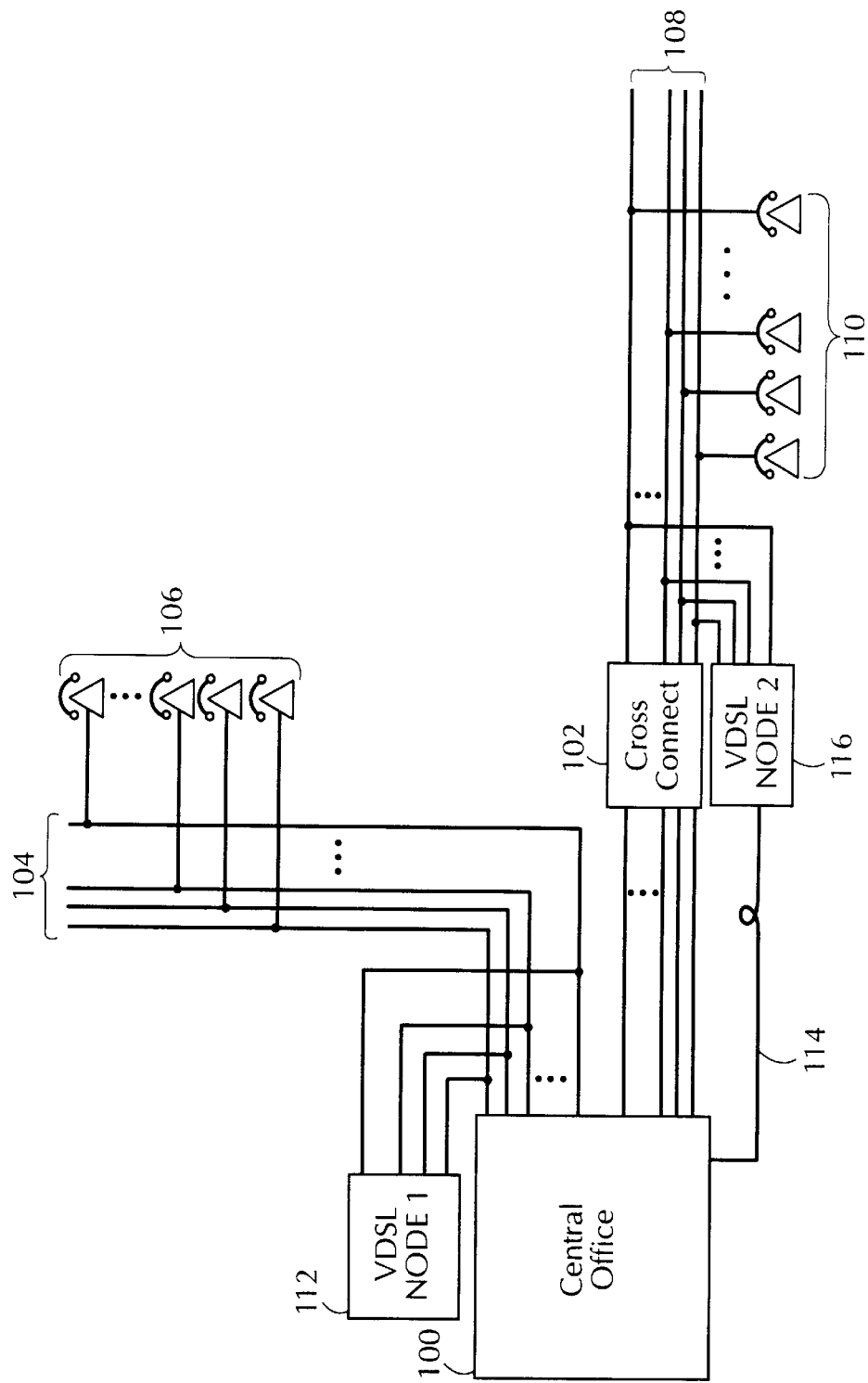
FIG. 2 is a block diagram illustrating the basic approach for distributing VDSL to subscribers.
Figure 3:
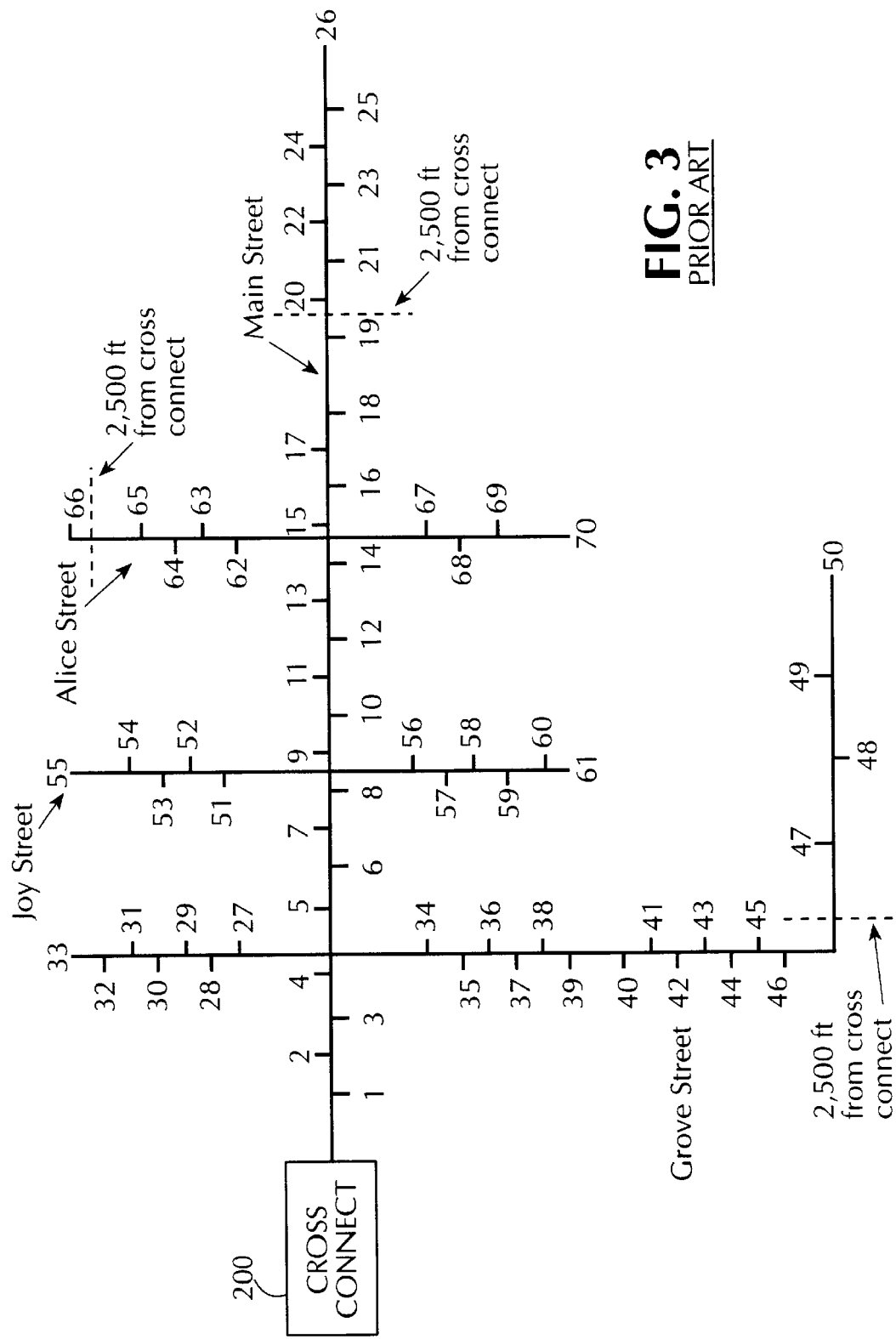
FIG. 3 is a block diagram showing a simplified street layout of sequentially numbered twisted pair lines from a cross connect to subscribers.
Figure 7:
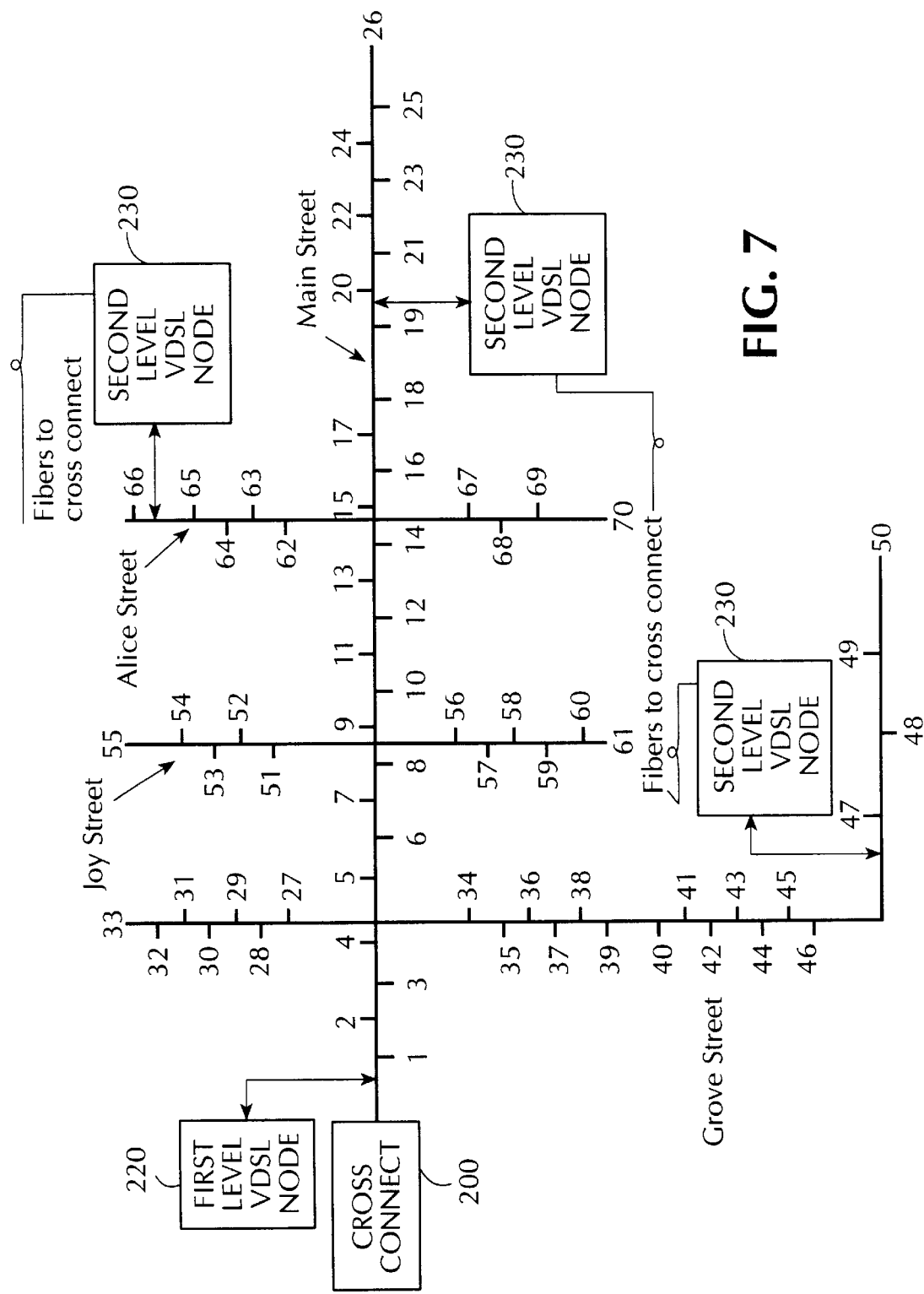
FIG. 7 is a block diagram showing the placement of VDSL nodes as calculated by a simplified version of the method of the present invention.

For example, in view of the contiguous groups revealed by processing the database of twisted pairs from the layout of FIG. 3, it can be determined that the placement of the calculated VDSL nodes as shown in FIG. 7 would ensure that all twisted pairs in FIG. 3 would be properly supplied.

As is shown in FIG. 7, the discriminated presence of the two contiguous groups of twisted pairs starting with number 20 and 48, as well as the group consisting of pair number 66, indicate that proper operation can be assured if, in addition to first level VDSL node 220 at the cross connect 200, second level VDSL nodes 230 are installed on Main Street at twisted pair number 20, on Grove Street at twisted pair number 47, and on Alice Street at twisted pair number 66. Note that this is the same result as was obtained in the estimate made by visual examination of the street layout. The time savings of the present invention will be even more significant for larger layouts.

The method steps described thus far will always calculate the number of branches of interest and thus provide a number and locations of nodes that would be sufficient to supply VDSL to any given street layout. Moreover, acceptable location of these nodes can be achieved by placing a node at the twisted pair from among each group that is closest to the cross connect.

However, it may be important to accurately estimate the minimum number of nodes that would be necessary to supply a given street layout. This may not always be the same as the number of branches of interest.

The inventors have determined empirically that the first group identified in FIG. 5D must always be supplied with a second level node. However, further second level nodes are not absolutely necessary unless the numerical distance between the first number of any discrete group of contiguous entries, such as those in FIG. 5D, and that of an immediately subsequent group is greater than a certain number, referred to hereinafter as a pair discontinuity criterion.

To account for this, the method of the present invention advantageously includes the additional discrimination step S10 of determining whether any groups are separated from the immediately subsequent group by more than the pair discontinuity criterion.

If none of the groups is so separated, then it is output, at step S11, that only one additional node, i.e., the one associated with the first group, need be added to the first level node at the cross connect. If at least one group is so separated, the flow proceeds to step S12 where the number of such groups is determined. Tallying such groups, and then adding one to account for the first group, which always gets a second level node, yields the minimum number of second level nodes necessary to service the street layout for a given cross connect. The result calculated is output at step S12. A method for calculating an appropriate pair discontinuity for any given neighborhood is given below.

In addition to the second level node or nodes that may be needed to supply pairs having a line length more than 2500 feet, additional nodes may also be needed to supply any twisted pair lines more than 5000 feet from a cross connect. The number and locations of such "third level" nodes would be determined by the same process delineated above. That is, the numerically-ordered complete database would be sorted by length, those entries of a distance greater than 5000 feet isolated, and the isolated entries sorted by number. Just as in applying the method to determine the necessity of second level nodes, sequential contiguous groups would be recognized, the first of such groups being assigned a third level node, and any subsequent groups being assigned third level nodes only if separated from the prior group by a pair discontinuity criterion, which, as will be discussed below, is different from that used to calculate second level nodes. The process also would have to be repeated for any pairs greater than 7500 feet (which require "fourth level" nodes), 10,000 feet ("fifth level" nodes), etc.

As discussed above, the pair discontinuity criterion (PDC) is a numerical criterion that has been determined empirically. It has been determined that the PDC used in the calculation of second level nodes should differ from that used for all subsequent level nodes. For second level nodes, the criterion is calculated according to the formula:

$$PDC_{SECONDLEVEL}=50*(F/A)$$

Where (F/A) is equal to the number of families (more accurately subscriber households) F per area A (in acres) in the region to be supplied with service. This criterion is used to calculate all second level nodes. All subsequent level nodes (third, fourth, et seq.) use a pair discontinuity criterion calculated according to the following formula:

$$PDC_{SUBSEQLEVEL}=10*(F/A)$$

It has been found that for average suburban street layouts the $PDC_{SECONDLEVEL}$ is equal to about 200. In the street layout of FIG. 3, it has been assumed for purposes of demonstrating the method of the present invention that the streets are much more sparsely populated than a normal neighborhood and would therefore have a very small PDC. If that assumption is removed, the number of second level nodes may be reduced.

For example, as discussed above, if the subscriber (family) density in FIG. 3 were dense enough to produce a significant value for the PDC, say, 35, the estimate for that layout might be reduced to a single second level node. This might be possible, for example, if the distance to even the furthest pairs from a point on the trunk cable at twisted pair 4 were less than 2500 feet. In that situation, one second level node, located at pair 4, could, in addition to the first level node at the cross connect, supply the entire street layout of FIG. 3.

It can therefore be seen from the foregoing that the present invention gives suppliers of DSL services a powerful tool for quickly and accurately estimating the number of VDSL nodes that would be necessary to supply VDSL service to a given neighborhood.

While the present invention has been described in terms of a preferred embodiment, the invention is not limited to the illustrated embodiments. For example, while the method of the present invention has been explained in relation to pairs ordered strictly sequentially without skipping, the method will work as long as the pairs are assigned substantially sequentially. That is, even if there are generally regular skips in the pair numbering along the various branches, such as numbering pairs with every other number, the final result of the sort will still allow for discrimination of discrete groups. It will be understood after having read the specification that variations and modifications can be effected within the spirit and scope of the invention as defined by the appended claims.

What is claimed:

1. A method for estimating a number of digital subscriber line nodes required to supply, from a line supply source, a geographically distributed network of substantially sequentially numbered twisted pair lines with digital subscriber line service, the method comprising the steps of:

storing, in number order, data entries for every twisted pair line of the network, each data entry comprising a pair number and a line length of the respective twisted pair line in relation to the line supply source;

sorting the stored entries by line length;

isolating those sorted entries having a line length greater than a predetermined maximum line length in relation to the line supply source;

sorting the isolated entries by number; and discriminating, from the sorted isolated entries, a number of discrete groupings of substantially contiguous entries, wherein the number of required line nodes is equal to one plus the number of discrete groups, other than a first such group, that are separated in line number from an immediately previous group by more than a predetermined number.

2. A method according to claim 1, wherein the predetermined number is calculated based upon an area density of subscribers in the geographically distributed network.

3. A method according to claim 1, wherein the method is repeated with respect to twisted pairs at integer multiples of the maximum line length.

4. An apparatus structured to estimate a number of digital subscriber line nodes required to supply, from a line supply source, a geographically distributed network of substantially sequentially numbered twisted pair lines with digital subscriber line service, the apparatus comprising:

means for storing, in number order, data entries for every twisted pair line of the network, each data entry comprising a pair number and a line length of the respective twisted pair line in relation to the line supply source;

means for sorting the stored entries by line length;

means for isolating those sorted entries having a line length greater than a predetermined maximum line length in relation to the line supply source;

means for sorting the isolated entries by number; and means for discriminating, from the sorted isolated entries, a number of discrete groupings of substantially contiguous entries, wherein the number of required line nodes is equal to one plus the number of discrete groups, other than a first such group, that are separated in line number from an immediately previous group by more than a predetermined number.

5. An apparatus according to claim 4, wherein the predetermined number is calculated based upon an area density of subscribers in the geographically distributed network.

6. An apparatus according to claim 4, wherein the isolating means is operable to isolate sorted entries having line lengths greater than integer multiples of the predetermined maximum line length.

7. A computer program embedded in a computer-readable storage medium storing code executable on a processor-controlled apparatus to cause the apparatus to perform a method for estimating a number of digital subscriber line nodes required to supply, from a line supply source, a geographically distributed network of substantially sequentially numbered twisted pair lines with digital subscriber line service, the method comprising:

storing, in number order, data entries for every twisted pair line of the network, each data entry comprising a pair number and a line length of the respective twisted pair line in relation to the line supply source;

sorting the stored entries by line length;

isolating those sorted entries having a line length greater than a predetermined maximum line length in relation to the line supply source;

sorting the isolated entries by number; and discriminating, from the sorted isolated entries, a number of discrete groupings of substantially contiguous entries, wherein the number of required line nodes is equal to one plus the number of discrete groups, other than a first such group, that are separated in line number from an immediately previous group by more than a predetermined number.

8. A computer program according to claim 7, wherein the predetermined number is calculated based upon an area density of subscribers in the geographically distributed network.

9. A computer program according to claim 7, wherein the method is repeated with respect to twisted pairs at integer multiples of the maximum line length.

10. A system for calculating a number of digital subscriber line nodes required to supply, from a line supply source, a geographically distributed network of substantially sequentially numbered twisted pair lines with digital subscriber line service, the system comprising:

a digital storage circuit that stores, in number order, data entries for every twisted pair line of the network, each data entry comprising a pair number and a line length of the respective twisted pair line in relation to the line supply source; and a digital logic circuit operable to interface with the digital storage circuit to:

sort the entries stored in the digital storage circuit by line length;

isolate those sorted entries having a line length greater than a predetermined length in relation to the line supply source;

sort the isolated entries by number; and discriminate, from the sorted isolated entries, a number of discrete groupings of substantially contiguous entries, wherein the number of required line nodes is equal to one plus the number of discrete groups, other than a first such group, that are separated in line number from an immediately previous group by more than a predetermined number.

11. A system according to claim 10, wherein the predetermined number is calculated based upon an area density of subscribers in the geographically distributed network.

12. A system according to claim 10, wherein the digital logic circuit is operable to isolate those sorted entries having a line length greater than integer multiples of the predetermined maximum line length.

13. A method for calculating a number and location of digital subscriber line nodes guaranteed to supply, from a line supply source, a geographically distributed network of substantially sequentially numbered twisted pair lines with digital subscriber line service, the method comprising the steps of:

- storing, in number order, data entries for every twisted pair line of the network, each data entry comprising a pair number and a line length of the respective twisted pair line in relation to the line supply source;
- sorting the stored entries by line length;
- isolating those sorted entries having a line length greater than a predetermined maximum line length in relation to the line supply source;
- sorting the isolated entries by number; and
- discriminating, from the sorted isolated entries, a number of discrete groupings of substantially contiguous entries,
- wherein the number of nodes is equal to the discriminated number of discrete groups and wherein the nodes are located at the twisted pair from among each discrete group having the shortest line length.

14. A method according to claim 13, wherein the method is repeated with respect to twisted pairs at integer multiples of the maximum line length.

15. An apparatus structured to calculate a number and location of digital subscriber line nodes guaranteed to supply, from a line supply source, a geographically distributed network of substantially sequentially numbered twisted pair lines with digital subscriber line service, the apparatus comprising:

- means for storing, in number order, data entries for every twisted pair line of the network, each data entry comprising a pair number and a line length of the respective twisted pair line in relation to the line supply source;
- means for sorting the stored entries by line length;
- means for isolating those sorted entries having a line length greater than a predetermined maximum line length in relation to the line supply source;
- means for sorting the isolated entries by number; and
- means for discriminating, from the sorted isolated entries, a number of discrete groupings of substantially contiguous entries,
- wherein the number of nodes is equal to the discriminated number of discrete groups and wherein the nodes are located at the twisted pair from among each discrete group having the shortest line length.

16. An apparatus according to claim 15, wherein the isolating means is operable to isolate sorted entries having line lengths greater than integer multiples of the predetermined maximum line length.

17. A computer program embedded in a computer-readable storage medium storing code executable on a processor-controlled apparatus to cause the apparatus to perform a method for calculating a number and location of digital subscriber line nodes guaranteed to supply, from a line supply source, a geographically distributed network of substantially sequentially numbered twisted pair lines with digital subscriber line service, the method comprising:

- storing, in number order, data entries for every twisted pair line of the network, each data entry comprising a pair number and a line length of the respective twisted pair line in relation to the line supply source;
- sorting the stored entries by line length;
- isolating those sorted entries having a line length greater than a predetermined maximum line length in relation to the line supply source;
- sorting the isolated entries by number; and
- discriminating, from the sorted isolated entries, a number of discrete groupings of substantially contiguous entries,
- wherein the number of nodes is equal to the discriminated number of discrete groups and wherein the nodes are located at the twisted pair from among each discrete group having the shortest line length.

18. A computer program according to claim 17, wherein the method is repeated with respect to twisted pairs at integer multiples of the maximum line length.

19. A system for calculating a number and location of digital subscriber line nodes guaranteed to supply, from a line supply source, a geographically distributed network of substantially sequentially numbered twisted pair lines with digital subscriber line service, the system comprising:

- a digital storage circuit that stores, in number order, data entries for every twisted pair line of the network, each data entry comprising a pair number and a line length of the respective twisted pair line in relation to the line supply source; and
- a digital logic circuit operable to interface with the digital storage circuit to:
  - sort the entries stored in the digital storage circuit by line length;
  - isolate those sorted entries having a line length greater than a predetermined maximum line length in relation to the line supply source;
  - sort the isolated entries by number; and
  - discriminate, from the sorted isolated entries, a number of discrete groupings of substantially contiguous entries,
  - wherein the number of nodes is equal to the discriminated number of discrete groups and wherein the nodes are located at the twisted pair from among each discrete group having the shortest line length.

20. A system according to claim 19, wherein the digital logic circuit is operable to isolate those sorted entries having a line length greater than integer multiples of the predetermined maximum line length.

* * * * *